United States Patent
Black et al.

(10) Patent No.: US 6,594,501 B2
(45) Date of Patent: Jul. 15, 2003

(54) SYSTEMS AND TECHNIQUES FOR CHANNEL GAIN COMPUTATIONS

(75) Inventors: Peter J. Black, San Diego, CA (US); Nagabhushana Sindhushayana, San Diego, CA (US); Raghu Challa, San Diego, CA (US); Rashid Attar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/104,208

(22) Filed: Mar. 20, 2002

(65) Prior Publication Data

US 2003/0114180 A1 Jun. 19, 2003

Related U.S. Application Data (60) Provisional application No. 60/340,512, filed on Dec. 14, 2001.

(51) Int. Cl.[7] .................... H04B 7/00; H04B 17/00; H04Q 7/22
(52) U.S. Cl. .................. 455/522; 455/69; 455/561; 330/279; 330/284; 370/317; 375/130
(58) Field of Search .................. 455/522, 69, 561, 455/127, 70, 67.3, 442, 437, 439; 330/279, 284, 208, 133, 149, 202; 375/130, 317, 342; 370/317–321, 326, 328, 335–337, 342–345

(56) References Cited

U.S. PATENT DOCUMENTS

| | | | | |
|---|---|---|---|---|
| 5,590,409 A | * | 12/1996 | Sawahashi et al. | ............ 455/69 |
| 5,884,187 A | * | 3/1999 | Ziv et al. | ..................... 455/522 |
| 5,918,184 A | * | 6/1999 | Wang | ......................... 455/561 |
| 5,974,041 A | * | 10/1999 | Kornfeld et al. | ............ 370/342 |
| 6,034,952 A | * | 3/2000 | Dohi et al. | .................. 370/335 |
| 6,278,701 B1 | * | 8/2001 | Ayyagari et al. | ............ 370/335 |
| 6,347,083 B1 | * | 2/2002 | Nishino | ...................... 370/342 |
| 6,377,813 B1 | * | 4/2002 | Kansakoski et al. | ......... 455/522 |

* cited by examiner

*Primary Examiner*—Nguyen T. Vo
*Assistant Examiner*—Kamran Afshar
(74) *Attorney, Agent, or Firm*—Phillip R. Wadsworth; Charles D. Brown; Kyong H. Macek (57) ABSTRACT

Systems and techniques for controlling transmission power involve receiving a first to second channel power ratio, receiving a first to second channel power ratio, adjusting the power ratio if a combined power of a plurality of channels exceeds a threshold, the channels including the first and second channels, and computing gain of the first channel as a function of the power ratio. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

75 Claims, 5 Drawing Sheets

SYSTEMS AND TECHNIQUES FOR CHANNEL GAIN COMPUTATIONS

CROSS REFERENCE

This application claims priority from Provisional Application No. 60/340,512, filed Dec. 14, 2001, entitled "Systems and Techniques for Channel Gain Computations" and is assigned to the assignee of the present application.

BACKGROUND

1. Field

The present invention relates to communications systems, and more specifically, to systems and techniques for controlling transmission power in a wireless communications system.

2. Background

Modern communications systems are designed to allow multiple users to access a common communications medium. Numerous multiple-access techniques are known in the art, such as time division multiple-access (TDMA), frequency division multiple-access (FDMA), space division multiple-access, polarization division multiple-access, code division multiple-access (CDMA), and other similar multi-access techniques. The multiple-access concept is a channel allocation methodology which allows multiple user access to a common communications link. The channel allocations can take on various forms depending on the specific multi-access technique. By way of example, in FDMA systems, the total frequency spectrum is divided into a number of smaller sub-bands and each user is given its own sub-band to access the communications link. Alternatively, in TDMA systems, each user is given the entire frequency spectrum during periodically recurring time slots. In CDMA systems, each user is given the entire frequency spectrum for all of the time but distinguishes its transmission through the use of a code.

In multi-access communications systems, techniques to reduce mutual interference between multiple users are often utilized to increase user capacity. By way of example, power control techniques can be employed to limit the transmission power of each user to that necessary to achieve a desired quality of service. This approach ensures that each user transmits only the minimum power necessary, but no higher, thereby making the smallest possible contribution to the total noise seen by other users. These power control techniques may become more complex in multi-access communications systems supporting users with multiple channel capability. In addition to limiting the transmission power of the user, the allocated power should be balanced between the multiple channels in a way that optimizes performance.

SUMMARY

In one aspect of the present invention, a method of controlling transmission power includes receiving a first to second channel power ratio, adjusting the power ratio if a combined power of a plurality of channels exceeds a threshold, the channels including the first and second channels, and computing gain of the first channel as a function of the power ratio.

In another aspect of the present invention, a computer readable media embodying a method of controlling transmission receives a first to second power ratio, adjusts the power ratio if a combined power of a plurality of channels exceeds a threshold, the channels including the first and second channels, and computes gain of the first channel as a function of the power ratio.

In yet another aspect of the invention, an apparatus including a transmitter gain control configured to receive a first to second channel power ratio, adjust the power ratio if a combined power of a plurality of channels exceeds a threshold, the channels including the first and second channels, compute gain of the first channel as a function of the power ratio, and a transmitter configured to apply the computed gain to the first channel, combine the channels, and apply a second gain to the combined channels.

In a further aspect of the present invention, an apparatus includes means for receiving a first to second power ratio, means for adjusting the power ratio if a combined power of a plurality of channels exceeds a threshold, the channels including the first and second channels, and means for computing gain of the first channel as a function of the power ratio.

It is understood that other aspects of the present invention will become readily apparent to those skilled in the art from the following detailed description, wherein is shown and described only exemplary embodiments of the invention, simply by way of illustration. As will be realized, the invention is capable of other and different embodiments, and its several details are capable of modifications in various respects, all without departing from the invention. Accordingly, the drawings and description are to be regarded as illustrative in nature, and not as restrictive.

BRIEF DESCRIPTION OF THE DRAWINGS

Aspects of the present invention are illustrated by way of example, and not by way of limitation, in the accompanying drawings in which like reference numerals refer to similar elements.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

In an exemplary embodiment of a communications system, a power control system can be used to increase the number of users that can be supported by the system. For those users with multi-channel capability, gain computation techniques can be employed to balance the relative transmission power between the channels. The gain computations can be performed through a power estimation process which controls the transmission power for one or more channels. In the event that the total transmission power exceeds the power limitations of the user, a systematic back off procedure can be used to reduce the gain of one or more channels.

Various aspects of these gain computation techniques will be described in the context of a CDMA communications system, however, those skilled in the art will appreciate that the techniques for gain computation of multiple channels are likewise suitable for use in various other communications environments. Accordingly, any reference to a CDMA communications system is intended only to illustrate the inventive aspects of the present invention, with the understanding that such inventive aspects have a wide range of applications.

CDMA is a modulation and multiple access scheme based on spread-spectrum communications. In a CDMA communications system, a large number of signals share the same frequency spectrum and, as a result, provide an increase in user capacity. This is achieved by transmitting each signal with a different pseudo-random noise (PN) code that modulates a carrier, and thereby, spreads the spectrum of the signal waveform. The transmitted signals are separated in the receiver by a correlator that uses a corresponding PN code to despread the desired signal=s spectrum. The undesired signals, whose PN codes do not match, are not despread in bandwidth and contribute only to noise.

Figure 1:
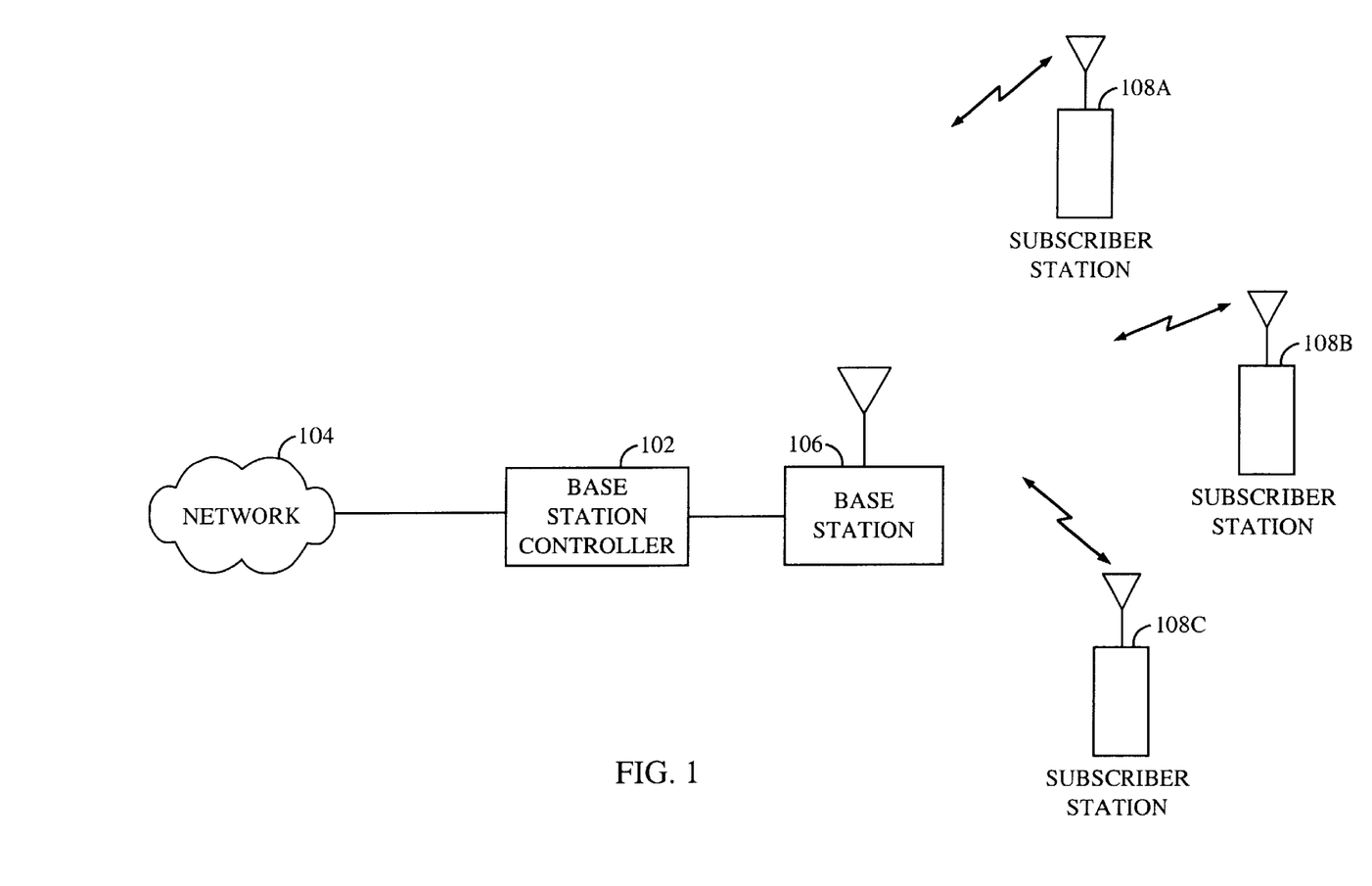
FIG. 1 is a simplified functional block diagram of an exemplary CDMA communications system.

FIG. 1 is a simplified functional block diagram of an exemplary CDMA communications system. A base station controller 102 can be used to provide an interface between a network 104 and all base stations dispersed throughout a geographic region. For ease of explanation, only one base station 106 is shown. The geographic region is generally subdivided into smaller regions known as cells. Each base station is configured to serve all subscriber stations in its respective cell. In some high traffic applications, the cell may be divided into sectors with a base station serving each sector. In the described exemplary embodiment, three subscriber stations 108a–c are shown in communication with the base station 106. Each subscriber station 108a–c may access the network, or communicate with other subscriber stations, through one or base stations under control of the base station controller 102.

A power control system can be employed to reduce mutual interference between the multiple subscriber stations. The power control system can be used to limit the transmission power over both the forward and reverse links to that necessary to achieve a desired quality of service. The forward link refers to transmissions from the base station to a subscriber station, and the reverse link refers to transmissions from a subscriber station to the base station. For the purposes of illustration, the gain computation techniques will be described with reference to the reverse link, however, as those skilled in the art will readily appreciate, these gain computation techniques are equally applicable to the forward link.

The reverse link transmission power is typically controlled with two power control loops. The first power control loop is an open loop control. The open control loop is designed to control the reverse link transmission power as a function of path loss, the effect of base station loading, and environmentally induced phenomena such as fast fading and shadowing. This open control loop estimation process is well known in CDMA communications systems.

The second power control loop is a closed loop control. The closed loop control has the function of correcting the open loop estimate to achieved a desired signal-to-noise ratio (SNR) at the base station. This can be achieved by measuring the reverse link transmission power at the base station and providing feedback to the subscriber station to adjust the reverse link transmission power. The feedback signal can be in the form of a reverse power control (RPC) command which is generated by comparing the measured reverse link transmission power at the base station with a power control set point. If the measured reverse link transmission power is below the set point, then an RPC up command is provided to the subscriber station to increase the reverse link transmission power. If the measured reverse link transmission power is above the set point, then an RPC down command is provided to the subscriber station to decrease the reverse link transmission power.

The open and closed loop controls may be used to control the transmission power of various reverse link channel structures. By way of example, in some CDMA communications systems, the reverse link waveform includes a traffic channel to carry voice and data services to the base station and a pilot channel used by the base station for coherent demodulation of the voice and data. In these systems, the open and closed loop controls can be used to control the reverse link power of the pilot channel. In order to optimize performance, the power of the pilot channel can then be balanced with the power of the traffic channel. Specifically, each channel can be spread with a unique orthogonal code generated by using Walsh functions. A gain can then applied to the traffic channel in order to maintain an optimal traffic to pilot channel power ratio.

This principle can be extended to additional channels in the reverse link waveform. In CDMA communications systems with a variable data rate, for example, a data rate control (DRC) channel containing a DRC message is generally supported by the reverse link transmission. In the variable data rate mode, the data rate of the forward link transmission is dictated by the DRC message. The DRC message is typically based on a carrier-to-interference (C/I) estimation performed at the subscriber station. This approach provides a mechanism for the base station to efficiently transmit the forward link data at the highest possible rate. An exemplary CDMA communications system supporting a variable data rate request scheme is a High Data Rate (HDR) communications system. The HDR communications system is typically designed to conform one or more standards such as the "cdma2000 High Rate Packet Data Air Interface Specification," 3GPP2 C.S0024, Version 2, Oct. 27, 2000, promulgated by a consortium called "$3^{rd}$ Generation Partnership Project," the contents of the aforementioned standard being incorporated by reference herein.

In the described exemplary HDR communications system, the reverse link transmission may also support an acknowledgment (ACK) channel. The ACK channel is used to indicate to the base station that the subscriber station has successfully decoded a packet received over the forward link. This can be achieved by sending an ACK message over the ACK channel.

In these HDR communications systems, the power of the pilot channel can also be balanced with the power of the DRC and ACK channels. This process involves spreading each of the DRC and ACK channels with a unique orthogonal code generated by using Walsh functions. A DRC gain can then be applied to the DRC channel to maintain an optimal DRC to pilot channel power ratio. Similarly, an ACK gain can also be applied to the ACK channel to maintain an optimal ACK to pilot channel power ratio.

Figure 2:
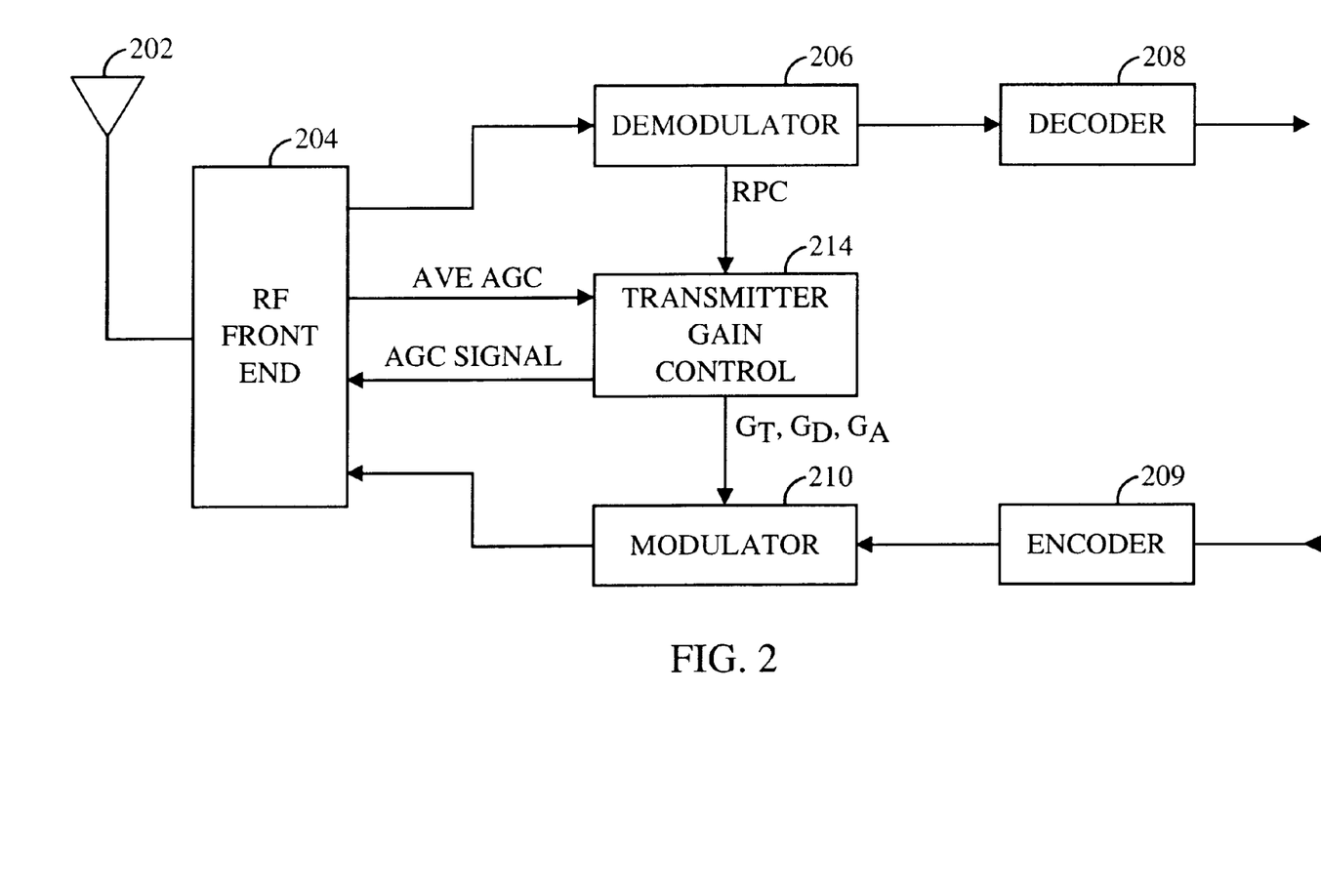
FIG. 2 is a functional block diagram of an exemplary subscriber station adapted for operation in a CDMA communications system.

A functional block diagram of an exemplary subscriber station operating in an HDR communications system is shown in FIG. 2. The exemplary subscriber station includes a receiver and a transmitter both coupled to an antenna 202. The receiver includes an RF front end 204, a demodulator 206 and a decoder 208. The transmitter includes an encoder 209, a modulator 210, and shares the RF front end 204 with the receiver. The transmitter also includes a transmitter gain control 214 to control the reverse link transmission power in a manner to be discussed in greater detail later.

The RF front end 204 is coupled to the antenna 202. The receiver portion of the front end 204 downconverts, filters, amplifies and digitizes a signal received by the antenna 202. The receiver portion of the RF front end 204 also includes an AGC (not shown) to maximize the dynamic range of the digitized signal. The AGC can be utilized by the transmitter gain control 214 to compute the path loss between the base station and the subscriber station during the open loop power control estimation. The digitized signal from the receiver portion of the RF front end 204 can then be coupled to the demodulator 206 where it is quadrature demodulated with short PN codes, decovered by Walsh codes, and descrambled using a long PN code. The demodulated signal can then be provided to the decoder 208 for forward error correction. The demodulator 206 can also be used to extract the RPC command from the reverse link transmission and provide it to the transmitter gain control 214 for closed loop power control computations.

The transmitter includes the encoder 209 which typically provides convolution coding and interleaving of the reverse link traffic channel. The encoded traffic channel is provided to the modulator 210 where it is spread with a Walsh cover and amplified by a traffic channel gain ($G_T$) computed by the transmitter gain control 214. The pilot channel, DRC channel, and ACK channel are also provided to the modulator 210 where they are each spread with a different Walsh cover and amplified by respective channel gains ($G_P$), ($G_D$), and ($G_A$) computed by the transmitter gain control 214. The channels are then combined, spread with a long PN code and quadrature modulated with short PN codes. The quadrature modulated signal is provided to the transmitter portion of the RF front end 204 where it is upconverted, filtered, and amplified for over the air forward link transmission through the antenna 202. The amplification of the quadrature modulated signal in the transmitter portion of the RF front end 204 is controlled by an AGC signal from the transmitter gain control 214.

Figure 3:
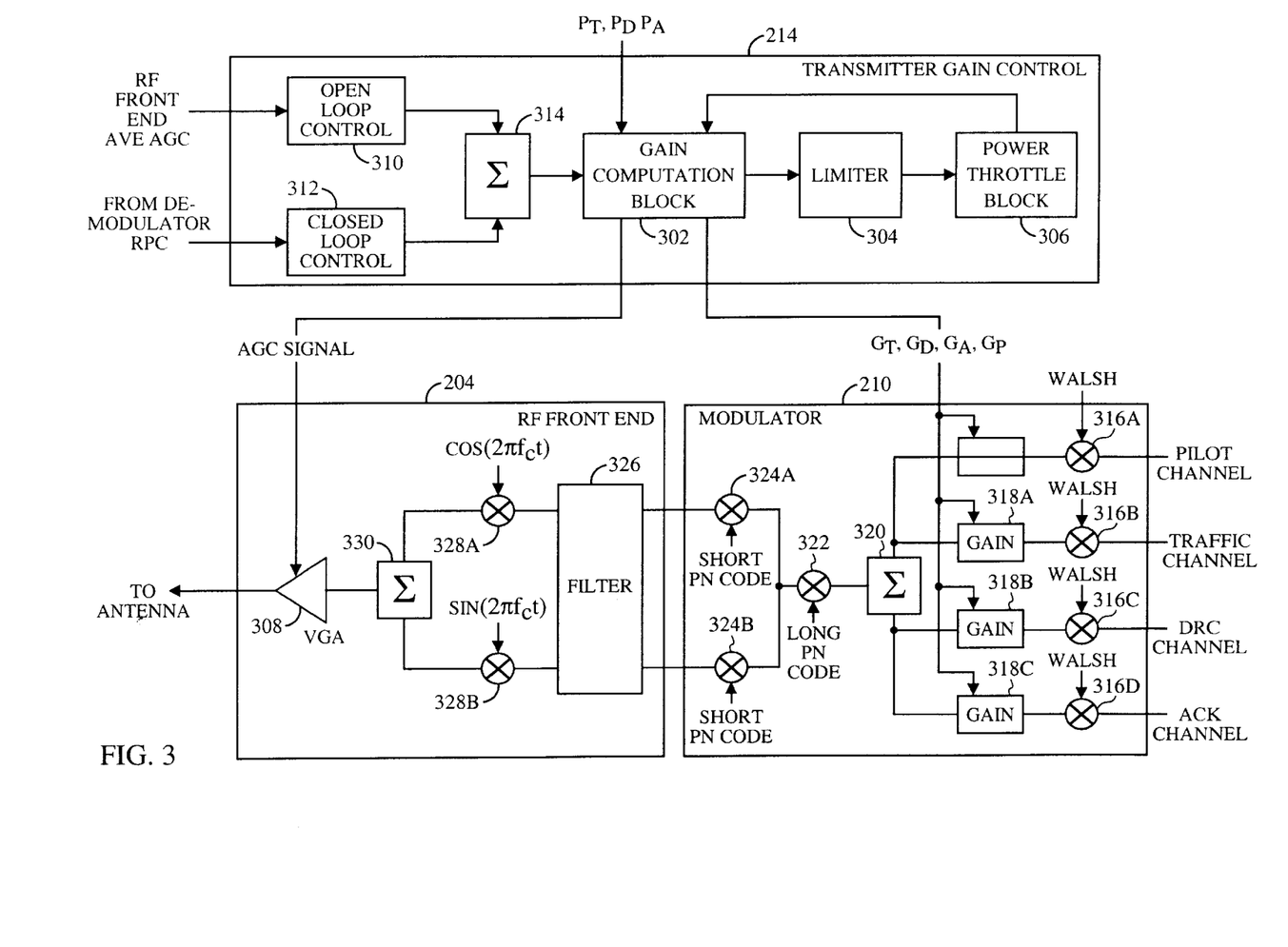
FIG. 3 is a functional block diagram an exemplary transmitter gain control and transmitter from the subscriber station of FIG. 2.

A functional block diagram of an exemplary transmitter gain control 214, modulator 210 and transmitter portion of the RF front end 204 is shown in FIG. 3. The transmitter gain control 214 includes a power and gain computation block 302 for computing the gains for the pilot, traffic, DRC, and ACK channels. The gain computations are based on predetermined power ratios for the traffic, DRC and ACK channels with respect to the pilot channel. A feedback loop can be used to reduce the channel gains under power limiting conditions by "throttling" or "backing off" the predetermined power ratios for the DRC and ACK channels. The feedback loop includes a limiter 304 and a power throttle block 306. The limiter 304 determines whether the total reverse link transmission power resulting from the predetermined power ratios exceeds the maximum power capability of the transmitter. The maximum power capability of the transmitter is limited by a variable gain amplifier (VGA) 308 and a power amplifier (not shown) in the RF front end 204. In the described exemplary embodiment, the power and gain computation block 302 also computes the total reverse link transmission power based on the predetermined power ratios and the estimated reverse link power for the pilot channel. If the resultant total reverse link transmission power exceeds the power capability of the transmitter, the power throttle block 306 is used to back off the power ratios for the DRC and ACK channels in a manner to be described in greater detail later.

The transmitter gain control 214 can be implemented with a variety of technologies including, by way of example, embedded communications software. The embedded communications software can be run on a programmable digital signal processor (DSP). Alternatively, the transmitter gain control 214 can be implemented with a general purpose processor running a software program, an application specific integrated circuit (ASIC), a field programmable gate array (FPGA) or other programmable logic device, discrete gate or transistor logic, discrete hardware components, or any combination thereof.

In the described exemplary embodiment, the power ratios for the traffic, DRC and ACK channels with respect to the pilot channel can be used to compute the channel gains. Accordingly, computational complexity can be reduced if the appropriate power ratios are first determined using the feedback loop before the gain computations are made. As explained above, the feedback loop is used to "throttle" or "back off" the predetermined power ratios of the DRC and ACK channels with respect to the pilot channel if the total reverse link transmission power exceeds the maximum power capability of the transmitter. The total reverse link transmission power can be computed by solving the following equation:

$$\text{Total Power} = \text{Pilot Channel Power} + 10 \log_{10} (1 + P_T + \beta_D \cdot P_D + \beta_A \cdot P_A) \quad (1)$$

where:

$P_T$ is the traffic to pilot channel power ratio;

$P_D$ is the DRC to pilot channel power ratio;

$\beta_D$ is a value used to back off the DRC power ratio;

$P_A$ is the ACK to pilot channel power ratio; and $\beta_A$ is a value used to back off the ACK power ratio.

The "Pilot Chanel Power" is estimated by two power control loops. An open loop control 310 generates an estimate of the required transmission power on the pilot channel based on the average value of the AGC from the receiver. The open loop estimate can then be computed by means well known in the art for nominal base station loading and Effective Radiated Power (ERP). Information about variations from the nominal base station loading and ERP can be communicated from the base station to the subscriber station and used to adjust the open loop estimate by means well known in the art.

A closed loop control 312 can be used to increment or decrement the current closed loop estimate based on the RPC commands recovered from the demodulator. The resultant closed loop estimate is summed with the open loop estimate by a summer 314. The sum of the open and closed loop estimates yields the total reverse link power for the pilot channel. This sum is provided to the power and gain computation block 302 where it is used as the "Pilot Channel Power" in equation (1).

The traffic to pilot channel power ratio $P_T$ can be computed in a variety of fashions. In at least one embodiment, the traffic to pilot channel power ratio can be predetermined for each data rate supported by the reverse link transmission either by empirical analysis, simulation, experimentation, or any other means to achieve a desired quality of service. By way of example, in at least one simulation it has been shown that for a 9.6 k data rate, the traffic to pilot channel ratio should be between −2.25 db and 9 dB. If the data rate is increased to 38.4 k, the traffic to pilot channel power ratio should be between 3.75 dB and 15 dB. Those skilled in the art will readily be able to determine the appropriate traffic to pilot channel power ratio values for all data rates supported by their particular application. These predetermined power ratio values can be stored at the base station and transmitted to each subscriber station in its respective cell or sector over a forward link control channel. Alternatively, the predetermined power ratio values can be stored or computed at the subscriber station.

The DRC to pilot channel power ratio $P_D$ and the ACK to pilot channel ratio $P_A$ can also be computed in a variety of fashions. Similar to the traffic to pilot channel power ratio, the DRC and ACK power ratios can be predetermined either by empirical analysis, simulation, experimentation, or any other means to achieve a desired quality of service. In at least one embodiment of the exemplary HDR communications system, the DRC to pilot channel power ratio can take on values between −9 dB and 6 dB in 1 dB increments and the ACK to pilot channel power ratio can take on values between −3 dB and 6 dB also in 1 dB increments. These predetermined power ratio values can be stored at the base station and transmitted to each subscriber station in its respective cell or sector over the control channel. Alternatively, the predetermined power ratio values can be stored or computed at the subscriber station.

To compute the total reverse link transmission power from equation (1), the channel power ratio values can be converted into the linear domain as follows:

$$P_T = 10^{(Traffic\ Power\ Ratio\ Value/10)} \quad (2)$$

$$P_D = 10^{(DRC\ Power\ Ratio\ Value/10)} \quad (3)$$

$$P_A = 10^{(ACK\ Power\ Ratio\ Value/10)} \quad (4)$$

The power throttle block 306 is used to reduce the power ratios for the DRC and ACK channels under power limiting conditions. The power throttle block 306 can accomplish this by generating values $\beta_D$ and $\beta_A$ and feeding them back to the power and gain computation block 302 for scaling the DRC and ACK power ratios, respectively. The DRC and ACK values can be expressed in the linear domain respectively as:

$$\beta_D = 10^{(-DRCbackoff/10)} \quad (5)$$

$$\beta_A = 10^{(-ACKbackoff/10)} \quad (6)$$

From the above equations, one skilled in the art will readily appreciate that a 1 dB reduction in the DRC to pilot channel power ratio can be achieved by setting "DRCbackoff" in equation (5) to 1. A 2 dB reduction in the ACK to pilot channel power ratio can be achieved by setting "ACKbackoff" in equation (6) to 2. Thus, any incremental reduction scheme can be implemented depending on the particular design parameters and the specific communications application.

In the described exemplary embodiment, the "Total Power" in equation (1) is initially computed by the power and gain computation block 302 with the values $\beta_D$ and $\beta_A$ set to 1 so that the power ratios for each channel are set to their predetermined optimal or desired values. The computed "Total Power" is provided to the limiter 304. The limiter 304 compares the computed "Total Power" to the maximum power capability of the transmitter. If the computed "Total Power" exceeds the power limitations of the transmitter, then the reverse link data rate can be lowered to reduce the total reverse link transmission power. In response to the reduced data rate, the power and gain computation block 302 selects a new predetermined traffic to pilot channel power ratio corresponding to the reduced data rate. The "Total Power" can then be recomputed by the power and gain computation block 302 and provided to the limiter 304 for comparison with the maximum power capability of the transmitter. This procedure continues until the computed "Total Power" comes within the power capability of the transmitter or the reverse link data rate is reduced to the lowest data rate supported by the communications system.

In the event that the "Total Power" computed by the power and gain computation block 302 exceeds the maximum power capability of the transmitter at the lowest data rate supported by the communications system, the limiter 304 can be used to ratchet the closed loop control 312 such that RPC up commands are ignored. This can be achieved by holding the current closed loop estimate constant in response to an RPC up command and reducing the current closed loop estimate in response to an RPC down command. In some embodiments, ratcheting can be supported at both ends of the transmitter power level such that RPC down commands are ignored if the reverse link transmission power is below a minimum operating threshold.

The limiter 304 also enables the power throttle block 306 to implement a "back off" algorithm to adjust the values $\beta_D$ and $\beta_A$ to systematically reduce the power ratios for one or both of the DRC and ACK channels until the "Total Power" computed by the power and gain computation block is within the maximum power capability of the transmitter. The manner in which the values $\beta_D$ and $\beta_A$ are reduced and the resultant incremental reduction in the power ratios of the channels may vary depending on the system application and the overall design constraints.

Figure 4:
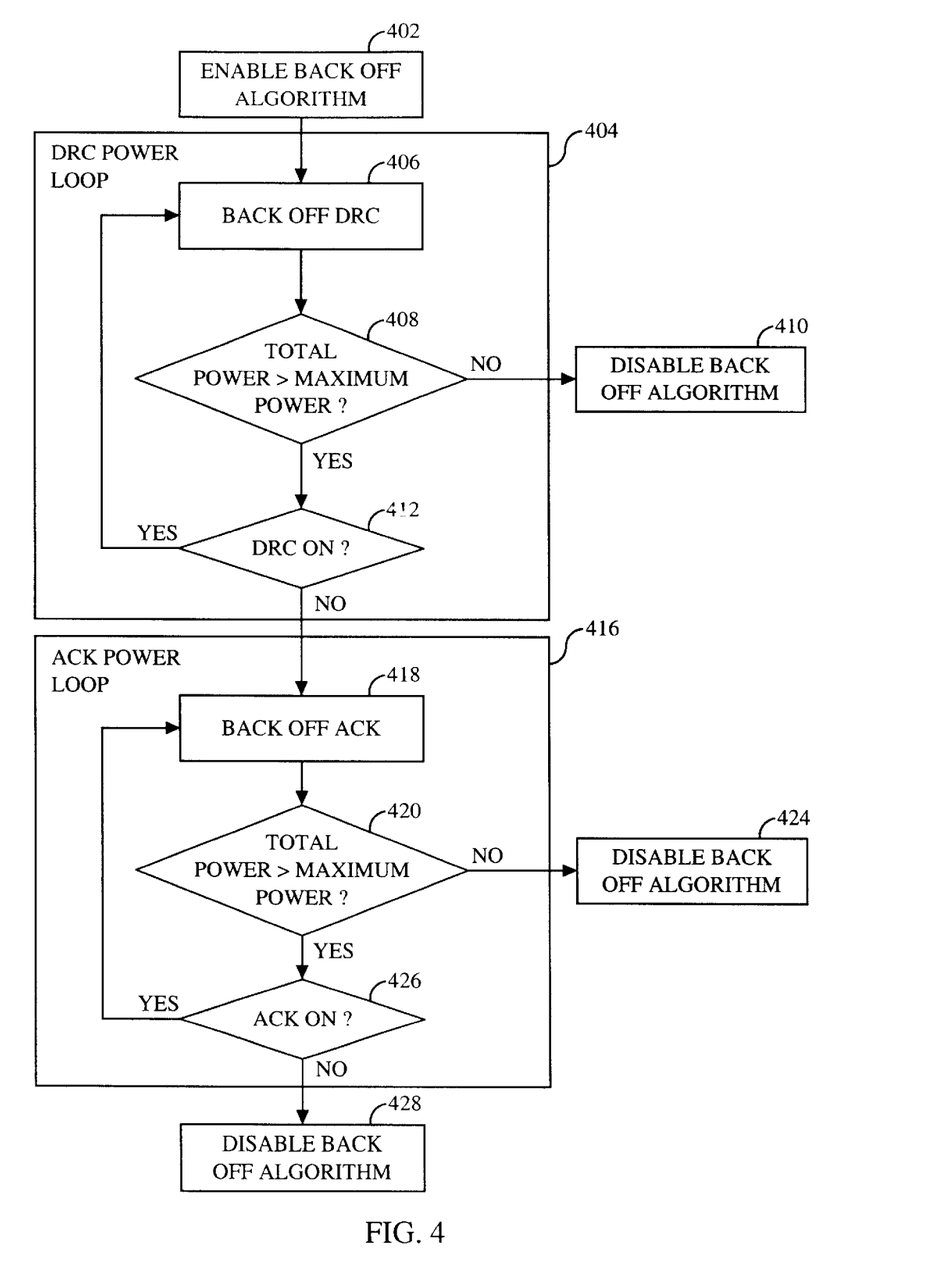
FIG. 4 is a flow chart illustrating an exemplary back off algorithm implemented by the transmitter gain control of FIG. 3.

A flow chart illustrating an exemplary back off algorithm is shown in FIG. 4. Initially, the limiter is used to enable the back off algorithm in step 402. Once the back off algorithm is enabled, a DRC power loop 404 is entered into. In the DRC power loop 404, the DRC to pilot channel power ratio can backed off by 1 dB in step 406. This can be achieved by recomputing the DRC value $\beta_D$ with the "DRCbackoff" in equation (5) at 1. Alternatively, the "DRCbackoff" in equation (5) can be set to any value to achieve a desired reduction in the DRC to pilot channel power ratio. In any event, the recomputed DRC value $\beta_D$ can be fed back to the to the power and gain computation block. The "Total Power" can then be recomputed and provided to the limiter to determine whether the total reverse link transmission power is within the maximum power capability of the transmitter.

In step 408, the results from the limiter are provided to the gain throttle block. If the recomputed "Total Power" is within the maximum power capability of the transmitter, the power throttle block is disabled in step 410. Conversely, if the recomputed "Total Power" still exceeds the maximum power capability of the transmitter, then the power throttle block determines whether the DRC channel remains in the "on" state in step 412. The DRC channel is determined to be in the "on" state it the DRC $\beta_D$ is greater than 0, or some other minimum threshold value. If the DRC channel remains in the "on" state, then the algorithm loops back to step 406 and reduces the DRC to pilot channel power ratio another dB by setting the "DRCbackoff" in equation (5) to 2 which will result in a 2 dB reduction in the DRC to pilot channel ratio. The back off algorithm remains in the DRC power loop 404 until either the power throttle block is disabled in step 410 or the DRC value $\beta_D$ is reduced below the minimum threshold. Should the DRC value $\beta_D$ be reduced below the minimum threshold, then the back off algorithm exits the DRC power gain loop 404 and enters an ACK power loop 416.

In the ACK power loop 416, the ACK to pilot channel power ratio can backed off by 1 dB in step 418. This can be achieved by recomputing the ACK value $\beta_A$ with the "ACKbackoff" in equation (6) at 1. Alternatively, the "ACKbackoff" in equation (6) can be set to any value to achieve a desired reduction in the ACK to pilot channel power ratio. In any event, the recomputed ACK value $\beta_A$ can be fed back to the to the power and gain computation block. The "Total Power" can then be recomputed and provided to the limiter 304 to determine whether the total reverse link transmission power is within the maximum power capability of the transmitter.

In step 420, the results from the limiter are provided to the gain throttle block. If the recomputed "Total Power" is within the maximum power capability of the transmitter, the power throttle block is disabled in step 424. Conversely, if the recomputed "Total Power" still exceeds the maximum power capability of the transmitter, then the power throttle block determines whether the ACK channel remains in the "on" state. The ACK channel is determined to be in the "on" state if the ACK value $\beta_A$ is greater than 0, or some other minimum threshold value. If the ACK channel remains in the "on" state, then the algorithm loops back to step 418 and reduces the ACK to pilot channel power ratio another dB by setting the "ACKbackoff" in equation (6) to 2 which will result in a 2 dB reduction in the ACK to pilot channel ratio. The back off algorithm remains in the ACK power loop 416 until either the power throttle block is disabled by the limiter in step 424 or the ACK value $\beta_A$ is reduced below the minimum threshold. Should the ACK value $\beta_A$ be reduced below the minimum threshold, then the back off algorithm is disabled by exiting the ACK power loop in step 424. In that event, other power reduction techniques can be employed to bring the total reverse link transmission power within the maximum power capability of the transmitter.

The exemplary embodiment of the back off algorithm described in connection with FIG. 4 may be computationally intensive depending on the predetermined power ratios for the DRC and ACK channels. By way of example, if the predetermined power ratios for the DRC and ACK channels are each set to the 6 dB maximum, there is a possibility that 16 passes through the DRC power loop and 10 passes through the ACK power loop might be required to back off the DRC and ACK power ratios. To reduce the potential computational complexity, an alternative back off algorithm may be implemented that computes the DRC value $\beta_D$ in a single step, and if necessary, computes the ACK value $\beta_A$ in a single step. This can be achieved in a variety of ways. By way of example, equation (1) can be manipulated to solve for the value of interest by defining a total power to pilot channel power ratio and setting it to a value relating to the maximum power capability of the transmitter. This can be achieved by rewriting equation (1) in the linear domain as:

$$R=1+P_T+P_D+P_A \qquad (7)$$

$$R_M \geq 1+P_T+\beta_D \cdot P_D+\beta_A \cdot P_A \qquad (8)$$

where R represents the total power to pilot channel power ratio before enabling the back off algorithm, and $R_M$ is the maximum allowed value of R after computing the values $\beta_D$ and $\beta_A$.

Figure 5:
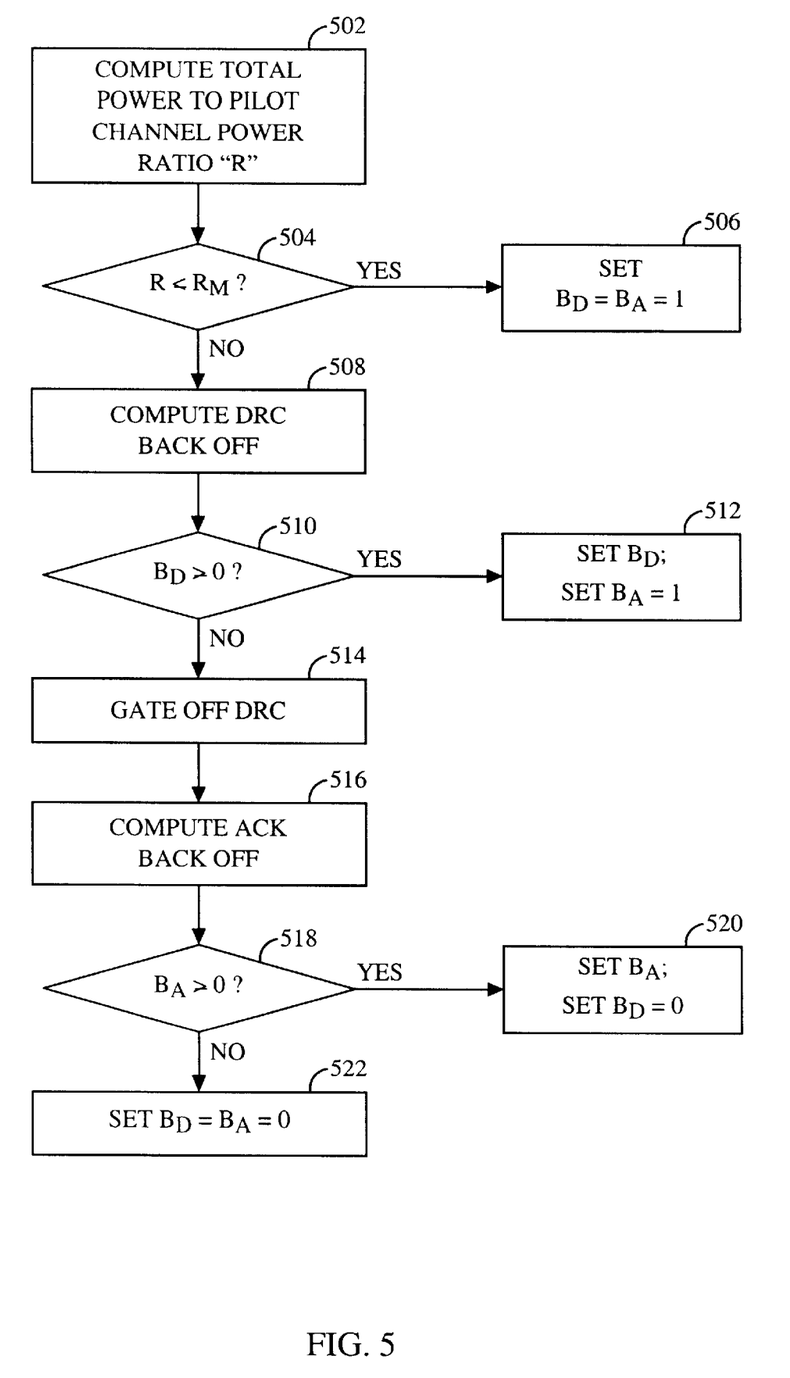
FIG. 5 is a flow chart illustrating an alternative exemplary back off algorithm implemented by the transmitter gain control of FIG. 3.

A flow chart illustrating an exemplary algorithm utilizing equations (7) and (8) is shown in FIG. 5. In step 502, the total power to pilot channel power ratio R is computed. The computed power ratio is then compared to the maximum allowable total power to pilot channel power ratio $R_M$ in step 504. If $R \leq R_M$, then the DRC and ACK power ratios do not require back off. In that event, the values $\beta_D$ and $\beta_A$ are set to 1 by the power throttle block and fed back to the power and gain computation block in step 506. Conversely, if R is greater than $R_M$, the DRC value $\beta_D$ can then be computed in step 508.

The DRC value $\beta_D$ can be computed by setting the ACK value $\beta_A$ to 1 and solving for the DRC value $\beta_D$ in equation (8). With the ACK value $\beta_A$ set to 1, equation (8) can be rewritten as:

$$\beta_D=(R_M-1-P_T-P_A)/P_D \qquad (9)$$

In step 510, the resultant DRC value computation is examined to determine whether it is positive. If $\beta_D \geq 0$, then the computed DRC value $\beta_D$ will reduce the DRC to pilot channel power ratio to a level that will result in a "Total Power" computation within the maximum power capability of the transmitter. In that event, the ACK value $\beta_A$ is set to 1 and fed back along with the computed DRC value $\beta_D$ to the power and gain computation block in step 512. Conversely, if the DRC value $\beta_D$ is negative, then the DRC channel is gated off by setting the DRC value $\beta_D$ to 0 in step 514.

Once the DRC channel is gated off, the ACK valve $\beta_A$ value can be computed in step 516. The ACK value $\beta_A$ can be computed by setting the DRC value $\beta_D$ to 0 and solving for the ACK value $\beta_A$ in equation (8). With the DRC value $\beta_D$ set to 0, equation (8) can be rewritten as:

$$\beta_A=(R_M-1-P_T)/P_A \qquad (10)$$

In step 518, the resultant ACK value computation is examined to determine whether it is positive. If $\beta_A \geq 0$, then the computed ACK value $\beta_A$ will reduce the ACK to pilot channel power ratio to a level that will result in a "Total Power" computation by the power and gain computation block within the maximum power capability of the transmitter. In that event, the DRC value $\beta_D$ is set to 0 and fed back along with the computed ACK value $\beta_A$ to the power and gain computation block in step 520. Conversely, if the ACK value $\beta_A$ is negative, then the ACK channel is gated off by setting the ACK value $\beta_A$ to 0 in step 522.

Regardless of the back off algorithm implemented by the power throttle block 306, the power and gain computation block 302 will compute the gains for the traffic, DRC, ACK and pilot channels once the limiter 304 determines that the total reverse link transmission power is within the maximum power capability of the transmitter. Since the gains will be applied to their respective channels in the digital domain, it is advantageous to scale the gains to prevent an increase in the number of bits as the gain adjusted channels are added together in the modulator. This can be accomplished by setting the gains such that the sum of their squares equals 1 as follows:

$$G_P^2+G_T^2+G_D^2+G_A^2=1 \qquad (10)$$

Equation (10) can be resolved as follows for each channel gain:

$$G_P=1/\sqrt{1+P_T+\beta_D \cdot P_D+\beta_A \cdot P_A} \qquad (11)$$

$$G_T=\sqrt{P_T}/\sqrt{1+P_T+\beta_D \cdot P_D+\beta_A \cdot P_A} \qquad (12)$$

$$G_D=\sqrt{\beta_D \cdot P_D}/\sqrt{1+P_T+\beta_D \cdot P_D+\beta_A \cdot P_A} \qquad (13)$$

$$G_A=\sqrt{\beta_A \cdot P_A}/\sqrt{1+P_T+\beta_D \cdot P_D+\beta_A \cdot P_A} \qquad (14)$$

Referring back to FIG. 3, the channel gains computed by the power and gain computation block 302 can be coupled to the modulator 210. The modulator 210 includes a mixer 316b which is used to spread the encoded traffic channel from the encoder with a Walsh function. The pilot, DRC and ACK channels are also provided to mixers 316a, 316c, and 316d, respectively, where they are each spread with a different Walsh cover. The Walsh covered traffic, pilot, DRC and ACK channels are provided to gain elements 318a–d, respectively, where their respective gains computed by the power and gain computation block 306 are applied. The output of the gain elements 318a–d are provided to a summer 320 where they are combined with the pilot channel. The combined channels are then coupled to a mixer 322 where they are spread using the long PN code. The spread channels are then split into a complex signal having an in-phase (I) component and a quadrature phase (Q) component. The complex signal is quadrature modulated with the short PN codes by mixers 324a and 324b before being output to the transmitter portion of the RF front end 204.

A complex baseband filter 326 is positioned at the input to the RF front end 204 to reject out of band components of the quadrature modulated signal. The filtered complex signal is provided to quadrature mixers 328a and 328b where it is modulated onto a carrier waveform before being combined by a summer 330. The combined signal is then provided to the VGA 308 to control the power of the reverse link transmission through the antenna. An AGC signal from the power and gain computation block 302 is used to set the gain of the of the VGA 308. The AGC signal is based on the "Total Power" computed by the power and gain computation block 302 from equation (1).

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of controlling transmission power, comprising:
   receiving a first to second channel power ratio;
   adjusting the power ratio if a combined power of a plurality of channels exceeds a threshold, the channels including the first and second channels; and
   computing gain of the first channel as a function of the power ratio.

2. The method of claim 1 further comprising applying the computed gain to the first channel, combining the channels, and applying a second gain to the combined channels.

3. The method of claim 2 wherein the application of the second gain comprises setting power of the second channel as a function of a criterion.

4. The method of claim 3 wherein the criterion comprises minimum power to achieve a quality of service at a remote site.

5. The method of claim 2 wherein the application of the second gain comprises computing the second gain as a function of received power of a transmission from a remote site.

6. The method of claim 2 wherein the application of the second gain comprises recovering a power command from a transmission received from a remote site and computing the second gain as a function of the recovered power command.

7. The method of claim 2 further comprising spreading each channel with a different code.

8. The method of claim 7 wherein the different codes each comprises a Walsh function.

9. The method of claim 1 wherein the power ratio adjustment comprises computing the combined power of the channels as a function of the power ratio and power for the second channel, comparing the combined power computation to the threshold, and reducing the power ratio if the combined power computation exceeds the threshold.

10. The method of claim 9 further comprising computing the power for the second channel as a function of a criterion.

11. The method of claim 10 wherein the criterion comprises minimum power to achieve a quality of service at a remote site.

12. The method of claim 10 wherein the power computation for the second channel comprises computing the power for the second channel as a function of received power of a transmission from a remote site.

13. The method of claim 10 wherein the power computation for the second channel comprises recovering a power command from a transmission received from a remote site and computing the power for the second channel as a function of the recovered power command.

14. The method of claim 9 wherein the power ratio reduction comprises reducing the power ratio in incremental steps.

15. The method of claim 9 wherein the power ratio reduction comprises computing the power ratio reduction as a function of the threshold.

16. The method of claim 1 wherein the channels further comprise a third channel, the method further comprising receiving a third to second channel power ratio, adjusting the third to second channel power ratio if the combined power of the channels exceeds the threshold with the first to second power ratio adjusted to zero, and computing gain of the third channel as a function of the third to second channel power ratio.

17. The method of claim 16 wherein the third to second channel power ratio adjustment comprises computing the combined power of the channels as a function of the third to second power ratio with the first to second power ratio adjusted to zero, comparing the combined power computation to the threshold, and reducing the third to second channel power ratio if the combined power computation exceeds the threshold.

18. The method of claim 17 wherein the third to second channel power ratio reduction comprises reducing the third to second channel power ratio in incremental steps.

19. The method of claim 17 wherein the third to second channel power ratio reduction comprises computing the third to second channel power ratio reduction as a function of the threshold.

20. The method of claim 1 further comprising receiving, in addition to the first to second channel power ratio, a power ratio for each remaining channel with respect to the second channel, and wherein the gain computation comprises dividing the square root of the first to second power ratio by the square root of the sum of the first to second channel power ratio and the power ratios for each of the remaining channels.

21. The method of claim 20 further comprising applying the computed gain to the first channel, combining the channels, and applying a second gain to the combined channels.

22. The method of claim 21 wherein the application of the second gain comprises computing the second gain as a function of received power of a transmission from a remote site.

23. The method of claim 21 wherein the application of the second gain comprises recovering a power command from a transmission received from a remote site and computing the second gain as a function of the recovered power command.

24. Computer readable media embodying a method of controlling transmission power, the method comprising:
receiving a first to second power ratio;
adjusting the power ratio if a combined power of a plurality of channels exceeds a threshold, the channels including the first and second channels; and
computing gain of the first channel as a function of the power ratio.

25. The computer-readable media of claim 24 wherein the power ratio adjustment comprises computing the combined power of the channels as a function of the power ratio and power for the second channel, comparing the combined power computation to the threshold, and reducing the power ratio if the combined power computation exceeds the threshold.

26. The computer-readable media of claim 25 wherein the method further comprises computing the power for the second channel as a function of a criterion.

27. The computer-readable media of claim 26 wherein the criterion comprises minimum power to achieve a quality of service at a remote site.

28. The computer-readable media of claim 25 wherein the power computation for the second channel comprises computing the power for the second channel as a function of received power of a transmission from a remote site.

29. The computer-readable media of claim 25 wherein the power computation for the second channel comprises recovering a power command from a transmission received from a remote site and computing the power of the second channel as a function of the recovered power command.

30. The computer-readable media of claim 25 wherein the power ratio reduction comprises reducing the power ratio in incremental steps.

31. The computer-readable media of claim 25 wherein the power ratio reduction comprises computing the power ratio reduction as a function of the threshold.

32. The computer-readable media of claim 24 wherein the channels further comprise a third channel, the method further comprising receiving a third to second channel power ratio, adjusting the third to second channel power ratio if the combined power of the channels exceeds the threshold with the first to second power ratio adjusted to zero, and computing gain of the third channel as a function of the third to second channel power ratio.

33. The computer-readable media of claim 32 wherein the third to second channel power ratio adjustment comprises computing the combined power of the channels as a function of the third to second channel power ratio with the first to second power ratio adjusted to zero, comparing the combined power computation to the threshold, and reducing the third to second channel power ratio if the combined power computation exceeds the threshold.

34. The computer-readable media of claim 33 wherein the third to second channel power ratio reduction comprises reducing the third to second channel power ratio in incremental steps.

35. The computer-readable media of claim 33 wherein the third to second channel power ratio reduction comprises computing the third to second power ratio reduction as a function of the threshold.

36. The computer-readable media of claim 24 wherein the method further comprises receiving, in addition to the first to second channel power ratio, a power ratio for each remaining channel with respect to the second channel, and wherein the gain computation comprises dividing the square root of the first to second channel power ratio by the square root of the sum of the first to second channel power ratio and the power ratios for each of the remaining channels.

37. An apparatus, comprising:
a transmitter gain control configured to receive a first to second channel power ratio, adjust the power ratio if a combined power of a plurality of channels exceeds a threshold, the channels including the first and second channels, compute gain of the first channel as a function of the power ratio; and
a transmitter configured to apply the computed gain to the first channel, combine the channels, and apply a second gain to the combined channels.

38. The apparatus of claim 37 wherein the transmitter gain control comprises an open loop control configured to estimate received power of a transmission from a remote site, the second gain being computed by the transmitter gain control as a function of the estimated received power.

39. The apparatus of claim 37 further comprising a receiver configured to receive a transmission from a remote site, the transmission having an power command, the transmitter gain control further configured to recover the power command from the transmission received and compute the second gain as a function of the recovered power command.

40. The apparatus of claim 37 wherein the apparatus further comprising a receiver configured to receive a transmission from a remote site, the transmission having an power command, the transmitter gain control comprising a closed loop control configured to recover the power command from the transmission received and an open loop control configured to estimate received power of the transmission, the second gain being computed by the transmitter gain control as a function of the recovered power command and the estimated received power.

41. The apparatus of claim 40 wherein the transmitter gain control further comprising a summer configured to sum the recovered power command and the estimated received power, the second gain being a function of the summed power command and the estimated received power.

42. The apparatus of claim 37 wherein the transmitter comprises a modulator configured to spread each of the first and second channels with a different code before the first and second channels are combined.

43. The apparatus of claim 42 wherein the different codes each comprises a Walsh function.

44. The apparatus of claim 42 wherein the transmitter comprises a front end having a variable gain amplifier, the combined first and second channels being provided to the variable gain amplifier and the second gain being used to control the gain of the variable gain amplifier.

45. The apparatus of claim 37 wherein the transmitter gain control is configured to adjust the power ratio by computing the combined power of the channels as a function of power of the second channel and the power ratio, comparing the combined power computation to the threshold, and reducing the power ratio if the combined power computation exceeds the threshold.

46. The apparatus of claim 45 wherein the transmitter gain control comprises an open loop control configured to estimate received power of a transmission from a remote site, the power of the second channel being computed by the transmitter gain control as a function of the estimated received power.

47. The apparatus of claim 45 further comprising a receiver configured to receive a transmission from a remote site, the transmission having an power command, the transmitter gain control further configured to recover the power command from the transmission received and compute the power of the second channel as a function of the recovered power command.

48. The apparatus of claim 45 wherein the apparatus further comprising a receiver configured to receive a transmission from a remote site, the transmission having an power command, the transmitter gain control comprising a closed loop control configured to recover the power command from the transmission received and an open loop control configured to estimate received power of the transmission, the power of the second channel being computed by the transmitter gain control as a function of the recovered power command and the estimated received power.

49. The apparatus of claim 48 wherein the transmitter gain control further comprising a summer configured to sum the recovered power command and the estimated received power, the power of the second channel being a function of the summed power command and the estimated received power.

50. The apparatus of claim 45 wherein the transmitter gain control is configured to reduce the power ratio in incremental steps.

51. The apparatus of claim 45 wherein the transmitter gain control is configured to compute the power ratio reduction as a function of the threshold.

52. The apparatus of claim 37 wherein the channels further comprise a third channel, the transmitter gain control further being configured to receive a third to second channel power ratio, adjust the third to second channel power ratio if the combined power of the channels exceeds the threshold with the first to second power ratio adjusted to zero, and compute gain of the third channel as a function of the third to second channel power ratio.

53. The apparatus of claim 52 wherein the transmitter gain control is configured to adjust the third to second channel power ratio by computing the combined power of the channels as a function of the third to second channel power ratio with the first to second channel power ratio adjusted to zero, comparing the combined power computation to the threshold, and reducing the third to second channel ratio if the combined power computation exceeds the threshold.

54. The apparatus of claim 53 wherein the transmitter gain control is configured to reduce the third to second channel power ratio in incremental steps.

55. The apparatus of claim 53 wherein the transmitter gain control is configured to compute the third to second channel power ratio as a function of the threshold.

56. The apparatus of claim 52 wherein the transmitter comprises a modulator configured to spread each of the first, second and third channels with a different code before the channels are combined.

57. The apparatus of claim 56 wherein the different codes each comprises a Walsh function.

58. The apparatus of claim 37 wherein the transmitter gain control is further configured to receive a power ratio for each of the channels with respect to the second channel, and wherein the gain computation comprises dividing the square root of the first to second channel power ratio by the square root of the sum of the power ratios for each of the channels.

59. The apparatus of claim 58 wherein the transmitter gain control comprises an open loop control configured to estimate received power of a transmission from a remote site, the second gain being computed by the transmitter gain control as a function of the estimated received power.

60. The apparatus of claim 58 further comprising a receiver configured to receive a transmission from a remote site, the transmission having an power command, the transmitter gain control further configured to recover the power command from the transmission received and compute the second gain as a function of the recovered power command.

61. The apparatus of claim 58 wherein t the apparatus further comprising a receiver configured to receive a transmission from a remote site, the transmission having an power command, the transmitter gain control comprising a closed loop control configured to recover the power command from the transmission received and an open loop control configured to estimate received power of the transmission, the second gain being computed by the transmitter gain control as a function of the recovered power command and the estimated received power.

62. The apparatus of claim 61 wherein the transmitter gain control further comprising a summer configured to sum the recovered power command and the estimated received power, the second gain being a function of the summed power command and the estimated received power.

63. An apparatus, comprising:

means for receiving a first to second power ratio;

means for adjusting the power ratio if a combined power of a plurality of channels exceeds a threshold, the channels including the first and second channels; and means for computing gain of the first channel as a function of the power ratio.

64. The apparatus of claim 63 wherein the means for adjusting the power ratio comprises means for computing the combined power of the channels as a function of the power ratio and power for the second channel, means for comparing the combined power computation to the threshold, and means for reducing the power ratio if the combined power computation exceeds the threshold.

65. The apparatus of claim 64 further comprising means for computing the power for the second channel as a function of a criterion.

66. The apparatus of claim 65 wherein the criterion comprises minimum transmission power to achieve a quality of service at a remote site.

67. The apparatus of claim 64 wherein the means for computing power for the second channel comprises means for estimating power of a received transmission from a remote site, the power for the second channel being computed as a function of estimated power.

68. The apparatus of claim 64 wherein the means for computing power for the second channel comprises means for recovering a power command from a transmission received from a remote site, the power for the second channel being computed as a function of the recovered power command.

69. The apparatus of claim 64 wherein the means for reducing the power ratio reduces the power ratio in incremental steps.

70. The apparatus of claim 64 wherein the means for reducing the power ratio computes the power ratio reduction as a function of the threshold.

71. The apparatus of claim 24 wherein the channels further comprise a third channel, the apparatus further comprising means for receiving a third to second channel power ratio, means for adjusting the third to second channel power ratio if the combined power of the channels exceeds the threshold with the first to second power ratio adjusted to zero, and means for computing gain of the third channel as a function of the third to second channel power ratio.

72. The apparatus of claim 71 wherein the means for adjusting the third to second channel power ration comprises means for computing the combined power of the channels as a function of the third to second channel power ratio with the first to second power ratio adjusted to zero, means for comparing the combined power computation to the threshold, and means for reducing the third to second channel power ratio if the combined power computation exceeds the threshold.

73. The apparatus of claim 72 wherein the means for reducing the third to second channel power ratio reduces the third to second channel power ratio in incremental steps.

74. The apparatus of claim 72 wherein the means for reducing the third to second channel power ratio computes the third to second power ratio reduction as a function of the threshold.

75. The apparatus of claim 63 further comprising, in addition to the means for receiving the first to second channel power ratio, means for receiving a power ratio for each remaining channel with respect to the second channel, and wherein the means for computing the gain of the first channel divides the square root of the first to second channel power ratio by the square root of the sum of the first to second channel power ratio and the power ratios for each of the remaining channels.

* * * * *